Aug. 6, 1968   A. P. BARTHOLOMEW, JR   3,395,583
ACCELEROMETER
Filed June 24, 1965   2 Sheets-Sheet 1

United States Patent Office 3,395,583
Patented Aug. 6, 1968

3,395,583
ACCELEROMETER
Albert P. Bartholomew, Jr., Allentown, Pa., assignor to Electro-Mechanical Instrument Co., Perkasie, Pa., copartners
Filed June 24, 1965, Ser. No. 466,746
8 Claims. (Cl. 73—514)

ABSTRACT OF THE DISCLOSURE

An accelerometer of the front face type is described. A pendulum is mounted for rotation in accordance with the acceleration forces. The motion of the pendulum about its axis is converted to motion of the pointer about a perpendicular axis by providing magnetic coupling between the pendulum and a permanent magnet mounted on the pointer carrying arbor.

---

Figure 1:
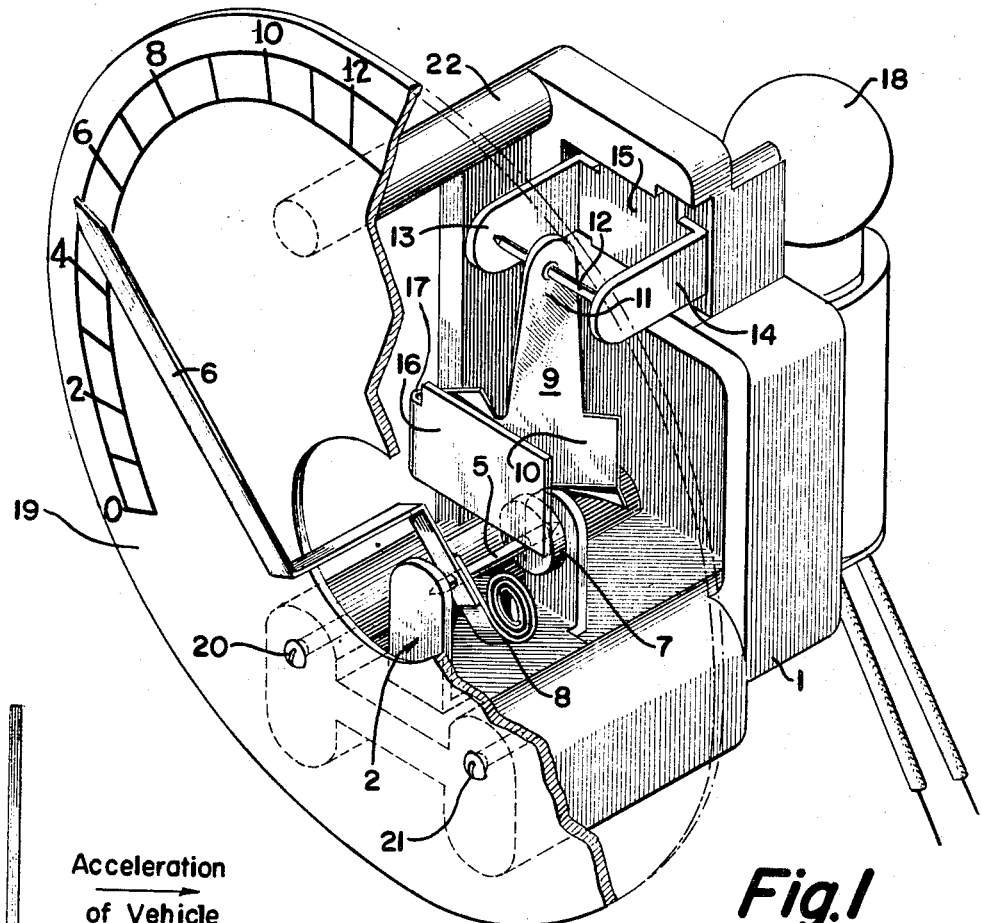

This invention relates to accelerometers and, more particularly, to a meter of the front-facing type which provides an indication of acceleration.

Often, it is desirable to provide a simple meter which will provide a reliable indication of acceleration. For example, it is often desirable to mount such a meter in an automobile or other vehicle to provide an indication of the acceleration or deceleration forces which the vehicle is undergoing.

One type of meter which is suitable for such an application is an accelerometer which utilizes a pendulum which moves in accordance with the acceleration forces thereon. The pendulum is used to actuate a pointer which moves over a meter dial to indicate the acceleration. One problem in such a meter is to construct the meter so that it can be mounted upright in the same plane with other meters which may be installed on the dashboard of the car. When the meter is mounted in this position, the pendulum for actuating the pointer will be moving in a direction perpendicular to the face of the meter because this is the direction of normal acceleration and deceleration in the vehicle.

Another problem is to provide a relatively friction-free mechanism which most efficiently converts the motion of the pendulum to motion of the pointer across the meter without binding or otherwise restricting the freedom of the pendulum to move.

Another problem is to provide a meter of this type in which the pointer moves across the scale in a relatively linear manner. That is, the scale divisions should be nearly equally spaced so that an increment of movement of the pointer at any place on the scale very nearly represents the same amount of acceleration or deceleration.

In accordance with one embodiment of this invention, there is provided a meter which can be mounted on the dashboard of a car. The meter dial is vertical, or tilted back at a very small angle. The positioning of the meter is similar to the positioning of other gauges found in an automobile. A pendulum is mounted to rotate about an axis which is perpendicular to the axis of rotation of the pointer. In order to convert the motion of the pendulum about its axis to motion of the pointer about a perpendicular axis, a magnetic coupling is provided between the magnet attracting pendulum and the permanent magnet, which is directly coupled to the pointer. The bottom of the pendulum is formed into an arcuate edge which is disposed adjacent to a permanent magnet mounted on the same arbor as is the meter pointer. As the pendulum rotates in response to acceleration forces, the arcuate edge attracts a pole of the permanent magnet and moves the permanent magnet, thereby causing the permanent magnet to follow the arcuate edge. This results in rotation of the permanent magnet and corresponding rotation of the pointer across the meter dial.

The magnetic coupling between the pendulum and the permanent magnet provides a relatively friction-free mechanism for converting the motion of the pendulum to motion of the pointer. Another important aspect of this invention is that the pendulum is shaped so that its motion is converted smoothly to movement of the pointer over the meter dial.

The edge of the pendulum adjacent the permanent magnet is maintained at a constant spacing from the permanent magnet as the pendulum rotates about the permanent magnet. This is important in obtaining a smooth sweep of the pointer across the scale in response to increasing acceleration or deceleration.

Figure 2:
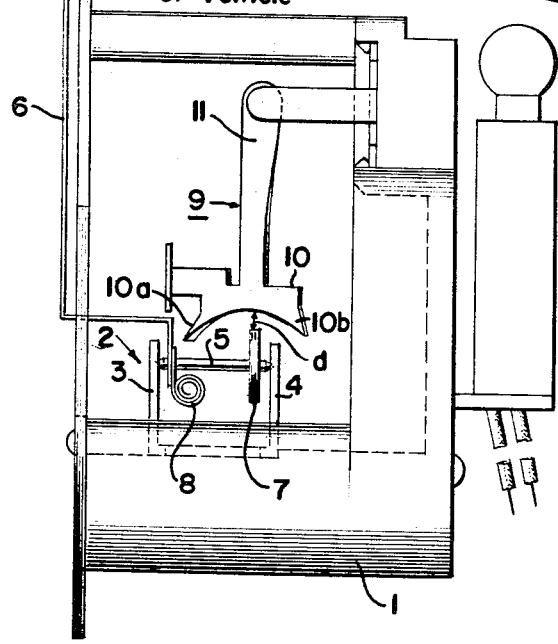
Figure 2A:
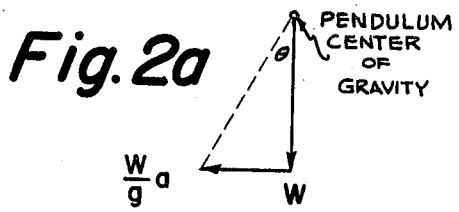
Figure 3:
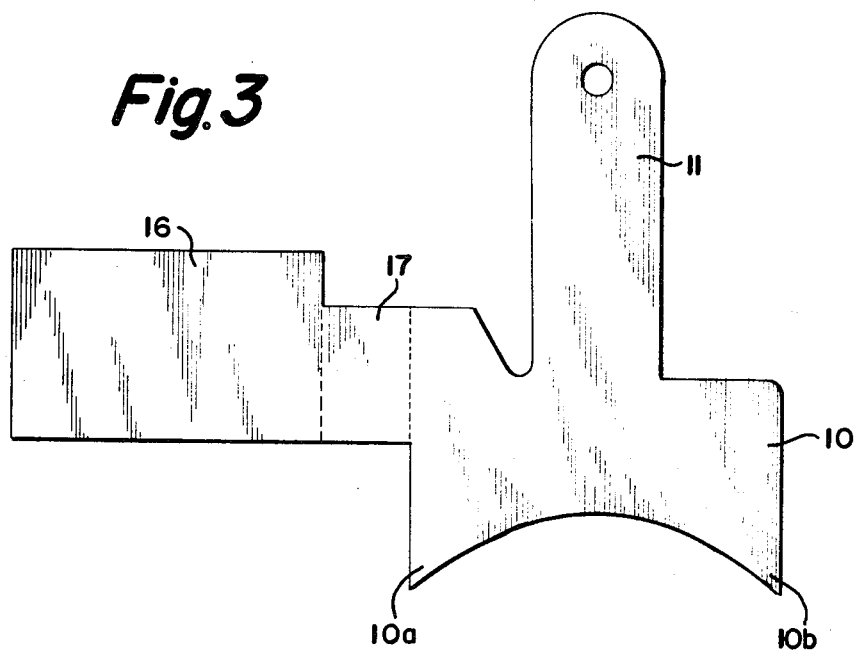
Figure 5:
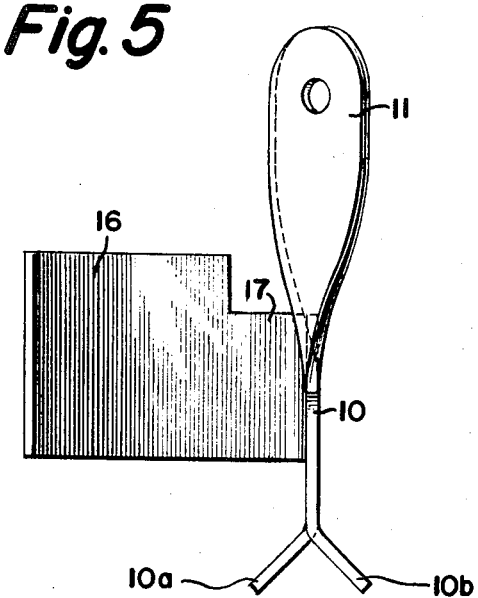
Figure 4:
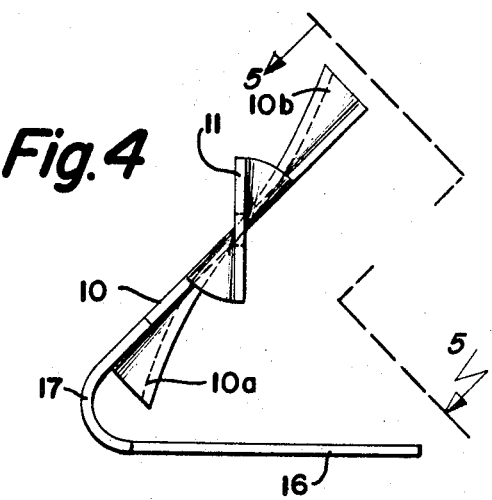

The foregoing, and other objects, features and advantages of the present invention, will be better understood from the following more detailed description and appended claims together with the drawings in which:

FIG. 1 shows a perspective view of the meter;
FIG. 2 shows a side view of the meter;
FIG. 2a is a force diagram;
FIG. 3 shows the blank from which the pendulum is formed;
FIG. 4 shows a top view of the pendulum; and
FIG. 5 shows an oblique side view of the pendulum.

Referring now to FIGS. 1 and 2, there is shown a mounting base 1, which may be constructed of plastic. The components of the accelerometer are mounted on base 1. A U-shaped bracket 2 is mounted in grooves formed in the mounting base 1. The U-shaped bracket 2 is constructed of any suitable non-magnetic material and includes two legs 3 and 4 each having bearing surfaces therein. An arbor 5 is disposed in these bearing surfaces. Mounted on the arbor 5 are a pointer 6 and a permanent magnet 7. As shown, the permanent magnet 7 is in the form of a disc mounted on arbor 5 through the center of the disc. A counterweight 8 is provided to counterbalance the pointer 6 so that it will be balanced on the arbor 5.

In order to sense the acceleration forces, a pendulum 9 is mounted for rotation in response to acceleration or deceleration. The pendulum 9 is formed of sheet metal having magnetic characteristics; i.e., there is an attraction between the pendulum and the permanent magnet 7. The pendulum 9 has a body portion 10 and a mounting arm 11 extending therefrom. The mounting arm 11 is twisted approximately 45° with respect to the body portion 10. The mounting arm 11 is disposed on an arbor 12 which is rotatably mounted in bearing surfaces in the legs 13 and 14 of the U-shaped bracket 15. The U-shaped bracket 15 is mounted in slots formed in the mounting base 1.

The body portion 10 of the pendulum has two wings 10a and 10b extending downwardly on either side of the body portion. As will be subsequently explained, the wings 10a and 10b are slightly bent away from the body portion 10 and in opposite directions with respect to each other. The wings 10a and 10b and the bottom edge of the pendulum define an arcuate edge which is disposed adjacent to the surface of the permanent magnet 7.

In order to establish the zero point for the pendulum 9, a portion of the pendulum forms a counterweight 16. This counterweight portion 16 can be bent so that the rest position of the meter is at the desired location.

As shown in FIGS. 1 and 2, the meter is undergoing acceleration which is indicated by the position of the pointer 6 on the scale. While the meter has been described in conjunction with indicating acceleration, it will be understood that the meter can easily be adapted for indicating deceleration.

The operation of the meter in registering acceleration will be better understood with reference to the force diagram of FIG. 2a. Assume that the meter is mounted upright in the vehicle, as is shown in FIG. 2, and the vehicle is accelerating toward the right, as indicated by the arrow at the top of FIG. 2, then there is an acceleration force on the pendulum which is toward the left, as is shown in FIG. 2a. The force is proportional to $$\frac{W}{g}a$$

where W is the weight of the pendulum; g is the gravitational constant; and a is acceleration. The other force acting on the pendulum is the weight of the pendulum W. This force is vertically downward, as is shown in FIG. 2a. These two forces are vectorially additive to rotate the pendulum to an agle θ about the axis of the arbor 12. As the pendulum 9 rotates about this axis, the arcuate surface at the bottom of the pendulum moves around the axis of the arbor 5, thereby causing the permanent magnet 7 to rotate. Rotation of the permanent magnet 7 causes the pointer to move upscale to register the acceleration force.

It is an important aspect of the present invention that as the pendulum rotates, the distance between the arcuate edge and the edge of the permanent magnet 7 never varies. Referring to FIG. 2, the distance between the arcuate edge and the permanent magnet 7 is labeled d. As the pendulum rotates, this distance d remains constant. This is quite important for the following reason. If the distance to the permanent magnet changes as the pendulum rotates then the magnetic attraction between the pendulum and the permanent magnet will vary. If the distance d is small, the magnetic attraction between the pendulum and the permanent magnet 7 is large. In this condition, a large acceleration is required to initiate rotation of the pointer. When this amount of acceleration is reached, the pendulum tends to break away and to rotate the pointer to a condition indicating the then existing value of acceleration. The pointer will jump over intervening readings of acceleration. For this reason, the reading of the pointer will be erratic and will not smoothly indicate an increasing value of acceleration. As an example, when the spacing between the arcuate edge and the permanent magnet is normal, it may be that a one-quarter degree of rotation of the pendulum will be required before the permanent magnet 7 will rotate to follow it. However, if this distance is smaller, then it may require as much as a degree of rotation of the pendulum before the permanent magnet will rotate to follow it. For this reason, rotation of the pointer would be erratic.

This problem is solved in accordance with the present invention by providing a pendulum which smoothly rotates about the permanent magnet with the bottom surface of the pendulum always being the same distance from the permanent magnet 7 regardless of the angle of rotation. As one example of the construction of an accelerometer in accordance with the principles of this invention, consider an accelerometer designed to measure the acceleration of a motor vehicle. Such a meter should measure acceleration from 0 to approximately 15 miles per hour per second. Referring to FIG. 2a, it should first be appreciated that the tangent of the angle of acceleration is directly proportional to acceleration. From FIG. 2a, it can be seen that:

$$\text{Tan } \theta = \frac{Wa/g}{W} = \frac{a}{g}$$

When the meter is subjected to an acceleration in the direction of the axis of the arbor 5, the pendulum 9 is subjected to two forces at its center of gravity. One is the weight of the pendulum which is in a direction normal to the surface of the earth. The other force is the inertial force opposite to the direction of the acceleration. These two forces, with corresponding movement arms, tend to balance each other and allow the pendulum to rotate through an angle θ. The force diagram in FIG. 2a shows that the weight force, the inertial force and the angle of rotation θ are all vectorially related. The relationship is such that the tangent of θ is equal to the inertial force $$\frac{W}{g}a$$

divided by the weight of the pendulum W. Since the weight of the pendulum cancels out of the relationship, the tangent of θ is equal to the acceleration of the meter divided by the gravitational constant. Therefore, the angle of rotation θ is proportional to the acceleration. By substituting acceleration values into this relationship, corresponding angles of θ can be computed. In calibrating the meter, only the relationship between the angle of rotation of the pendulum and the position of the pointer on the dial face must be determined. Each dial reading is related to the rotational angle of the pendulum and the corresponding value of acceleration in setting up the dial.

While there are other possible pendulum shapes which will produce the desired effect of maintaining a constant distance from the lower edge of the pendulum to the permanent magnet as the pendulum rotates about the permanent magnet, one shape of a pendulum which has been produced is shown in FIGS. 3–5. The pendulum is fabricated from a flat blank of sheet metal having magnet attracting properties. The blank is shown in FIG. 3. The mounting arm 11 is twisted approximately 45° with respect to the body portion 10, as shown in FIGS. 4 and 5. As is also shown in FIGS. 4 and 5, the counterweight 16 is bent in the region 17 to a position such that the center of gravity of the pendulum will fall in a line extending from the mounting hole in the mounting arm 11 through the portion of the bottom edge which will be adjacent the permanent magnet 7 when the pendulum is in its zero position. As shown in FIG. 4, the angle between the counterweight 16 and the main body portion 10 can be increased or decreased to adjust the zero position of the pendulum. An alternative to including the counterweight 16 integrally with the pendulum is an arrangement in which the counterweight is a separate piece which is mounted on the arbor 12. By rotating the counterweight on the arbor 12 relative to the position of the pendulum, the zero position of the pendulum can be adjusted.

Certain details of the accelerometer have not thus far been described. There is mounted on the rear of the mounting base 1 a light 18 for illuminating the dial 19. The dial 19 is secured to the mounting body by two screws 20 and 21. The mounting base 1 includes a protruding column 22 which engages the back side of the dial 19 to complete a three-point mount. This results in the dial 19 and mounting base 1 being secured together without the possibility of relative motion therebetween.

While a particular embodiment of the invention has been shown and described, it will, of course, be understood that various modifications can be made without departing from the principles of the invention. The appended claims are, therefore, intended to cover any such modifications within the true spirit and scope of the invention.

What is claimed is:

1. An accelerometer comprising
    a first arbor mounted for rotation about an axis parallel to the direction of normal acceleration being measured,
    an indicating pointer mounted on said first arbor for rotation therewith,
    a permanent magnet mounted on said first arbor,
    a second arbor mounted for rotation about an axis transverse to the direction of normal acceleration being measured, and a pendulum mounted on said second arbor, said pendulum being formed of metal having magnetic characteristics, said pendulum having an arcuate edge disposed adjacent said permanent magnet so that as said pendulum rotates in response to acceleration forces, the arcuate edge attracts a pole of said permanent magnet thereby causing said permanent magnet to rotate following said arcuate edge.

2. An accelerometer comprising a first arbor mounted for rotation about an axis parallel to the direction of normal acceleration being measured, an indicating pointer mounted on said first arbor for rotation therewith, a permanent magnet mounted on said first arbor, a second arbor mounted for rotation about an axis transverse to the direction of normal acceleration being measured, and a pendulum mounted on said second arbor, said pendulum being formed of metal having magnetic characteristics, said pendulum having an arcuate edge disposed adjacent said permanent magnet so that as said pendulum rotates in response to acceleration forces, the arcuate edge attracts a pole of said permanent magnet thereby causing said permanent magnet to rotate following said arcuate edge, said arcuate edge having a shape such that the spacing between said arcuate edge and said permanent magnet is constant as said pendulum rotates.

3. An accelerometer comprising a first arbor mounted for rotation about an axis parallel to the direction of normal acceleration being measured, an indicating pointer mounted on said first arbor for rotation therewith, a permanent magnet mounted on said first arbor, a second arbor mounted for rotation about an axis transverse to the direction of normal acceleration being measured, and a pendulum mounted on said second arbor, said pendulum being formed of sheet metal having magnetic characteristics, said pendulum having an arcuate edge disposed adjacent said permanent magnet so that as said pendulum rotates in response to acceleration forces, the arcuate edge attracts a pole of said permanent magnet thereby causing said permanent magnet to rotate following said arcuate edge, said pendulum including:

a body portion, a mounting arm twisted 45° with respect to said body portion, and two wings extending on either side of said body portion and forming, with one edge of said body portion, said arcuate edge.

4. The accelerometer recited in claim 3 wherein said pendulum further includes a counterweight extending from said body portion and bent to a position such that the center of gravity of said pendulum falls in a line extending from the point at which said pendulum is mounted on said second arbor through the portion of said arcuate edge which is adjacent said permanent magnet when said pendulum is in its zero position.

5. An accelerometer of the front-facing type comprising a mounting base, a first U-shaped bracket affixed to said mounting base and having bearing surfaces in the legs thereof, a first arbor mounted in said last-named bearing surfaces for rotation about an axis parallel to the direction of normal acceleration being measured, a scale calibrated in amount of acceleration, a pointer mounted on said first arbor and disposed for movement over said scale, a permanent magnet mounted on said first arbor, a second U-shaped bracket affixed to said mounting base and having bearing surfaces in the legs thereof, a second arbor mounted in said last-named bearing surfaces for rotation about an axis transverse to the direction of normal acceleration, and a pendulum mounted on said second arbor, said pendulum being formed of metal having magnetic characteristics, said pendulum having an arcuate edge at the bottom thereof disposed adjacent said permanent magnet so that as said pendulum rotates in response to acceleration forces, the arcuate edge attracts a pole of said permanent magnet thereby causing said permanent magnet to rotate following said arcuate edge, said arcuate edge having a shape such that the spacing between said arcuate edge and said permanent magnet is constant as said pendulum rotates.

6. The accelerometer recited in claim 5 wherein said pendulum is formed of sheet metal and includes a body portion, a mounting arm twisted 45° with respect to said body portion, and two wings extending on either side of said body portion and forming, with one edge of said body portion, said arcuate edge.

7. The accelerometer recited in claim 6 wherein said pendulum further includes a counterweight extending from said body portion and bent to a position such that the center of gravity of said pendulum falls in a line extending from the point at which said pendulum is mounted on said second arbor through the portion of said arcuate edge which is adjacent said permanent magnet when said pendulum is in its zero position.

8. The accelerometer recited in claim 5 wherein said permanent magnet is a disc of magnetic material mounted on said first arbor through the center of said disc.

References Cited

UNITED STATES PATENTS 2,154,678  4/1939  Hawthorne et al. _____ 33—215

JAMES J. GILL, *Primary Examiner.*